(12) United States Patent
Steele

(10) Patent No.: US 11,164,319 B2
(45) Date of Patent: Nov. 2, 2021

(54) MACHINE LEARNING FEATURE VECTOR GENERATOR USING DEPTH IMAGE FOREGROUND ATTRIBUTES

(71) Applicant: Smith & Nephew, Inc., Memphis, TN (US)

(72) Inventor: Kevin Steele, Carlsbad, CA (US)

(73) Assignee: Smith & Nephew, Inc., Memphis, TN (US)

( * ) Notice: Subject to any disclaimer, the term of this patent is extended or adjusted under 35 U.S.C. 154(b) by 91 days.

(21) Appl. No.: 16/710,608

(22) Filed: Dec. 11, 2019

(65) Prior Publication Data

US 2020/0202534 A1 Jun. 25, 2020

Related U.S. Application Data

(60) Provisional application No. 62/783,119, filed on Dec. 20, 2018.

(51) Int. Cl.
*G06T 7/194* (2017.01)
*G06N 20/00* (2019.01)
*G06N 3/04* (2006.01)

(52) U.S. Cl.
CPC .............. *G06T 7/194* (2017.01); *G06N 3/04* (2013.01); *G06N 20/00* (2019.01);
(Continued)

(58) Field of Classification Search
CPC ........... G06T 7/194; G06T 2207/10028; G06T 2207/20084; G06T 2207/20081;
(Continued)

(56) References Cited

U.S. PATENT DOCUMENTS 6,591,146 B1 7/2003 Pavlovic et al.
6,944,317 B2 9/2005 Pavlovic et al.
(Continued)

FOREIGN PATENT DOCUMENTS

CN 101512598 A 8/2009
CN 106875398 A 6/2017
(Continued)

OTHER PUBLICATIONS

Hynes, A. et al., Human Part Segmentation in Depth Images with Annotated Part Positions, 2018, 15 pages, vol. 18, 1900.
(Continued)

*Primary Examiner* — Juan A Torres
(74) *Attorney, Agent, or Firm* — Kacvinsky Daisak Bluni PLLC

(57) ABSTRACT

Certain aspects provide a method, including: receiving a depth image from a depth sensor; receiving a segmentation mask corresponding to the depth image and segmenting the depth image into a set of foreground pixels and a set of background pixels; determining a set of seed pixels in the depth image; for each respective seed pixel of the set of seed pixels: determining a sampling line in the depth image that starts at the respective seed pixel and passes through a portion of the depth image; for each respective sampling line pixel in the sampling line having a value in the segmentation mask indicating a foreground object in the depth image: determining one or more data attribute values based on a depth value for the respective sampling line pixel in the depth image; and adding the one or more data attribute values to a feature vector.

20 Claims, 7 Drawing Sheets

(52) U.S. Cl.
CPC ........... *G06T 2207/10028* (2013.01); *G06T 2207/20081* (2013.01); *G06T 2207/20084* (2013.01)

(58) Field of Classification Search
CPC ... G06T 7/70; G06T 2207/30196; G06T 7/11; G06N 20/00; G06N 3/04; G06N 3/084
USPC ....................................................... 382/173
See application file for complete search history.

(56) References Cited

U.S. PATENT DOCUMENTS

| | | |
|---|---|---|
| 7,324,594 B2 | 1/2008 | Lamboray et al. |
| 7,574,031 B2 | 8/2009 | Dehmeshki |
| 7,630,549 B2 | 12/2009 | Aharon et al. |
| 7,758,264 B2 | 7/2010 | Jawerth et al. |
| 8,050,498 B2 | 11/2011 | Wilensky et al. |
| 8,331,669 B2 | 12/2012 | Artan et al. |
| 8,346,688 B2 | 1/2013 | Carroll et al. |
| 8,366,788 B2 | 2/2013 | Moser et al. |
| 8,625,897 B2 | 1/2014 | Criminisi et al. |
| 8,744,847 B2 | 6/2014 | Paul et al. |
| 8,840,680 B2 | 9/2014 | Goldfarb et al. |
| 8,938,390 B2 | 1/2015 | Xu et al. |
| 9,129,379 B2 | 9/2015 | Sorgi et al. |
| 9,152,243 B2 | 10/2015 | Gu |
| 9,161,708 B2 | 10/2015 | Elliott et al. |
| 9,251,429 B2 | 2/2016 | Pham et al. |
| 9,269,155 B2 | 2/2016 | Zhang et al. |
| 9,280,719 B2 | 3/2016 | Criminisi et al. |
| 9,285,788 B2 | 3/2016 | Nicoletti et al. |
| 9,311,550 B2 | 4/2016 | Sun et al. |
| 9,330,307 B2 | 5/2016 | Litvak et al. |
| 9,355,651 B2 | 5/2016 | Xu et al. |
| 9,372,979 B2 | 6/2016 | Klein |
| 9,478,039 B1 | 10/2016 | Wang et al. |
| 9,704,258 B2 | 7/2017 | Luo et al. |
| 9,741,125 B2 | 8/2017 | Baruch et al. |
| 9,747,717 B2 | 8/2017 | Fleishman et al. |
| 9,767,586 B2 | 9/2017 | Liang et al. |
| 9,799,348 B2 | 10/2017 | Paul et al. |
| 9,867,573 B2 | 1/2018 | Giancardo et al. |
| 9,953,223 B2 | 4/2018 | Lin et al. |
| 9,955,140 B2 | 4/2018 | Rhemann et al. |
| 9,965,865 B1 | 5/2018 | Agrawal et al. |
| 10,002,460 B2 | 6/2018 | Black et al. |
| 10,109,055 B2 | 10/2018 | Xu et al. |
| 10,176,299 B2 | 1/2019 | Torres et al. |
| 10,186,038 B1 | 1/2019 | Kluckner et al. |
| 10,198,621 B2 | 2/2019 | Takeda et al. |
| 10,223,934 B2 | 3/2019 | Paul |
| 10,515,463 B2 * | 12/2019 | Takeda ...................... G06T 7/11 |
| 2012/0039535 A1 | 2/2012 | Wilensky et al. |
| 2013/0266223 A1 | 10/2013 | Zhang et al. |
| 2014/0056471 A1 | 2/2014 | Gu |
| 2014/0072212 A1 | 3/2014 | Sorgi et al. |
| 2014/0254919 A1 | 9/2014 | Sun et al. |
| 2014/0255887 A1 | 9/2014 | Xu et al. |
| 2015/0272504 A1 | 10/2015 | Giancardo et al. |
| 2016/0014392 A1 | 1/2016 | Liang et al. |
| 2016/0351074 A1 | 12/2016 | Paul et al. |
| 2017/0009133 A1 | 1/2017 | Emoto et al. |
| 2017/0061817 A1 | 3/2017 | Mettler May |
| 2017/0124717 A1 * | 5/2017 | Baruch .................. G06T 7/194 |
| 2017/0202724 A1 | 7/2017 | De Rossi et al. |
| 2017/0340261 A1 | 11/2017 | Torres |
| 2017/0359228 A1 | 12/2017 | O'Neill et al. |
| 2018/0150713 A1 | 5/2018 | Farooqi et al. |
| 2018/0289313 A1 | 10/2018 | Inan et al. |
| 2018/0295419 A1 | 10/2018 | Thielen et al. |
| 2019/0009133 A1 | 1/2019 | Mettler May |
| 2019/0046836 A1 | 2/2019 | Starkey |
| 2019/0088004 A1 * | 3/2019 | Lucas .................. G06K 9/6202 |

FOREIGN PATENT DOCUMENTS

| | | |
|---|---|---|
| CN | 106875399 A | 6/2017 |
| CN | 106875400 A | 6/2017 |
| CN | 106886999 A | 6/2017 |
| CN | 106887007 A | 6/2017 |
| CN | 106898002 A | 6/2017 |
| CN | 108121997 A | 6/2018 |
| EP | 3327616 A1 | 5/2018 |
| EP | 3425591 A1 | 1/2019 |
| KR | 20120049636 A | 5/2012 |
| KR | 20140109790 A | 9/2014 |
| WO | 2013091369 A1 | 6/2013 |
| WO | 2015088863 A2 | 6/2015 |
| WO | 2015168274 A1 | 11/2015 |
| WO | 2017210654 A2 | 12/2017 |

OTHER PUBLICATIONS

Lee, J. et al., Graph Cut-Based Human Body Segmentation in Color Images Using Skeleton Information from the Depth Sensor, 2019, 12 pages, vol. 19, 393.

* cited by examiner

MACHINE LEARNING FEATURE VECTOR GENERATOR USING DEPTH IMAGE FOREGROUND ATTRIBUTES

CROSS-REFERENCE TO RELATED CASES

This application claims the benefit of U.S. Provisional Patent Application No. 62/783,119, entitled "Machine Learning Feature Generator Using Depth Image Foreground Attributes", filed on Dec. 20, 2018, the entire contents of which is incorporated herein by reference.

INTRODUCTION

Aspects of the present disclosure relate to machine learning, and in particular to generating machine learning features for training and inferencing based on depth image data.

Machine learning is generally a method for training a model (e.g., an artificial neural network, a tree, or other structures) that represents a generalized fit to a set of training data. Applying the trained model to new data produces inferences, which may be used to gain insights into the new data.

Machine learning models are frequently used to interpret image data. However, many machine learning algorithms require one-dimensional (or unidimensional) input data, which is generally incompatible with two-dimensional image data. Even though it is possible to create a vector of data from an image, such as by row or column concatenation, the resulting vector data may nevertheless not be compatible with preferred machine learning algorithms, such as those used to train a fully-connected neural network. Thus, conventional approaches for analyzing image data using machine learning models are restricted by the inherent format of image data.

Accordingly, what are needed are improved systems and methods for generating unidimensional feature data for machine learning models based on multi-dimensional input data.

BRIEF SUMMARY

Certain embodiments provide a method of determining foreground object characteristics of image data, comprising: receiving a depth image of a first size from a depth sensor; receiving a segmentation mask of the first size, wherein the segmentation mask corresponds to the depth image and segments the depth image into a set of foreground pixels and a set of background pixels; determining a set of seed pixels in the depth image, wherein the set of seed pixels either fully or partially encloses a foreground object in the depth image; for each respective seed pixel of the set of seed pixels: determining a sampling line in the depth image that starts at the respective seed pixel and passes through a portion of the depth image; for each respective sampling line pixel in the sampling line having a value in the segmentation mask indicating a foreground object in the depth image: determining one or more data attribute values based on a depth value for the respective sampling line pixel in the depth image; and adding the one or more data attribute values to a feature vector.

Other embodiments provide a system for determining foreground object characteristics of image data, comprising: a memory comprising computer-executable instructions; one or more processors configured to execute the computer-executable instructions and cause the system to: receive a depth image of a first size from a depth sensor; receive a segmentation mask of the first size, wherein the segmentation mask corresponds to the depth image and segments the depth image into a set of foreground pixels and a set of background pixels; determine a set of seed pixels in the depth image, wherein the set of seed pixels either fully or partially encloses a foreground object in the depth image; for each respective seed pixel of the set of seed pixels: determine a sampling line in the depth image that starts at the respective seed pixel and passes through a portion of the depth image; for each respective sampling line pixel in the sampling line having a value in the segmentation mask indicating a foreground object in the depth image: determine one or more data attribute values based on a depth value for the respective sampling line pixel in the depth image; and add the one or more data attribute values to a feature vector.

Further embodiments provide computer-readable media comprising instructions that, when executed by one or more processors of a processing system, perform the aforementioned method as well as other methods described herein.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
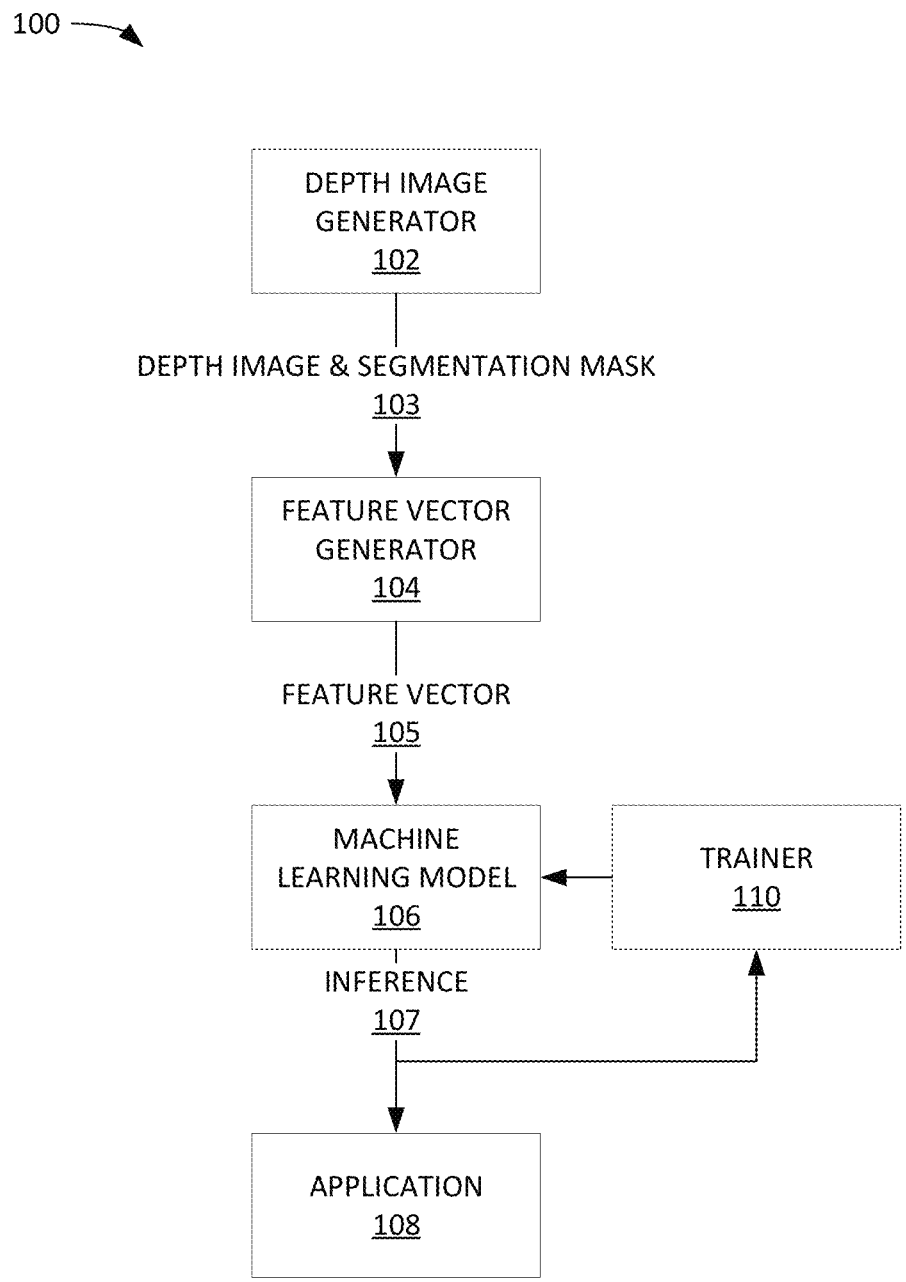
FIG. 1 depicts an example system for generating and processing unidimensional feature data for machine learning models based on multi-dimensional input data.

Aspects of the present disclosure provide apparatuses, methods, processing systems, and computer readable mediums for generating unidimensional feature data for machine learning models based on multi-dimensional input data.

Conventional approaches for performing foreground object feature analysis using machine learning models require a multi-dimensional (e.g., 2D) depth image as input data and thus are not compatible with vector-based input. Consequently, conventional approaches are limited to the use of those machine learning algorithms that can take multi-dimensional image data as an input, such as a convolutional neural network, which is a multi-dimensional counterpart to an artificial neural network in which layers have a two-dimensional structure rather than a unidimensional structure.

As mentioned briefly above, it is possible to take multi-dimensional input data, such as two-dimensional image data, and create a vector from the image data by sequentially concatenating or stacking all of the columns or rows of the input image. The resulting vector of data, however, is generally not a usable input for training certain types of machine learning models, such as a fully-connected neural networks for regression tasks because the large number of inter-neuron connections between layers requires too many memory and processing resources. Further, the resulting vector would generally be unnecessarily large and contain a significant amount of data with no utility, which would increase the computational load of such data in a machine learning model and slow down the machine learning model. Consequently, the method of vectorization of multi-dimensional input data is important not only for machine learning algorithm compatibility, but also for resulting machine learning model performance.

Described herein are systems and methods for creating a feature vector based on multi-dimensional image data that overcome the shortcomings of conventional methods. Such systems and methods may, for example, convert multi-dimensional image data (e.g., depth images and corresponding segmentation masks) into a form suitable for use with machine learning algorithms that conventionally could not directly process multi-dimensional data formats. Further, the resulting input data vectors generated by the systems and methods described herein are more compact than those generated by conventional vectorization methods (e.g., stacking), and thus result in improved training and inferencing performance of machine learning models.

One application for the systems and methods described herein is analysis of objects in depth image data. In particular, the algorithms described herein can generate specific features (or characteristics) of a foreground object in a two-dimensional depth image and use the features with machine learning methods requiring unidimensional feature vectors.

Thus, the systems and methods described herein beneficially enable the use of previously unsuitable machine learning algorithms for foreground object characteristic inferencing based on depth image input data. For example, the systems and methods described herein are compatible with fully-connected neural networks, decision trees, random decision forests, Bayesian networks, K-nearest neighbor algorithms, support vector machines, and ensemble learning algorithms, to name a few examples.

Moreover, the systems and methods described herein offer several advantages over conventional methods, such as: improving training accuracy of regression tasks when compared with using multi-dimensional image data (e.g., 2D depth images) as the feature input; reducing training time when compared with using multi-dimensional image data as the feature input; and reducing machine learning model size when compared to using multi-dimensional image data as the feature input, which in turn improves inference performance with respect to time taken and compute resources utilized during inference. Thus, the systems and methods described herein provide a technical solution to an extant technical problem associated with the field of machine learning.

Example System for Generating and Processing Unidimensional Feature Data for Machine Learning Models Based on Multi-Dimensional Input Data FIG. 1 depicts an example system 100 for generating and processing unidimensional feature data for machine learning models based on multi-dimensional input data.

Figure 2:
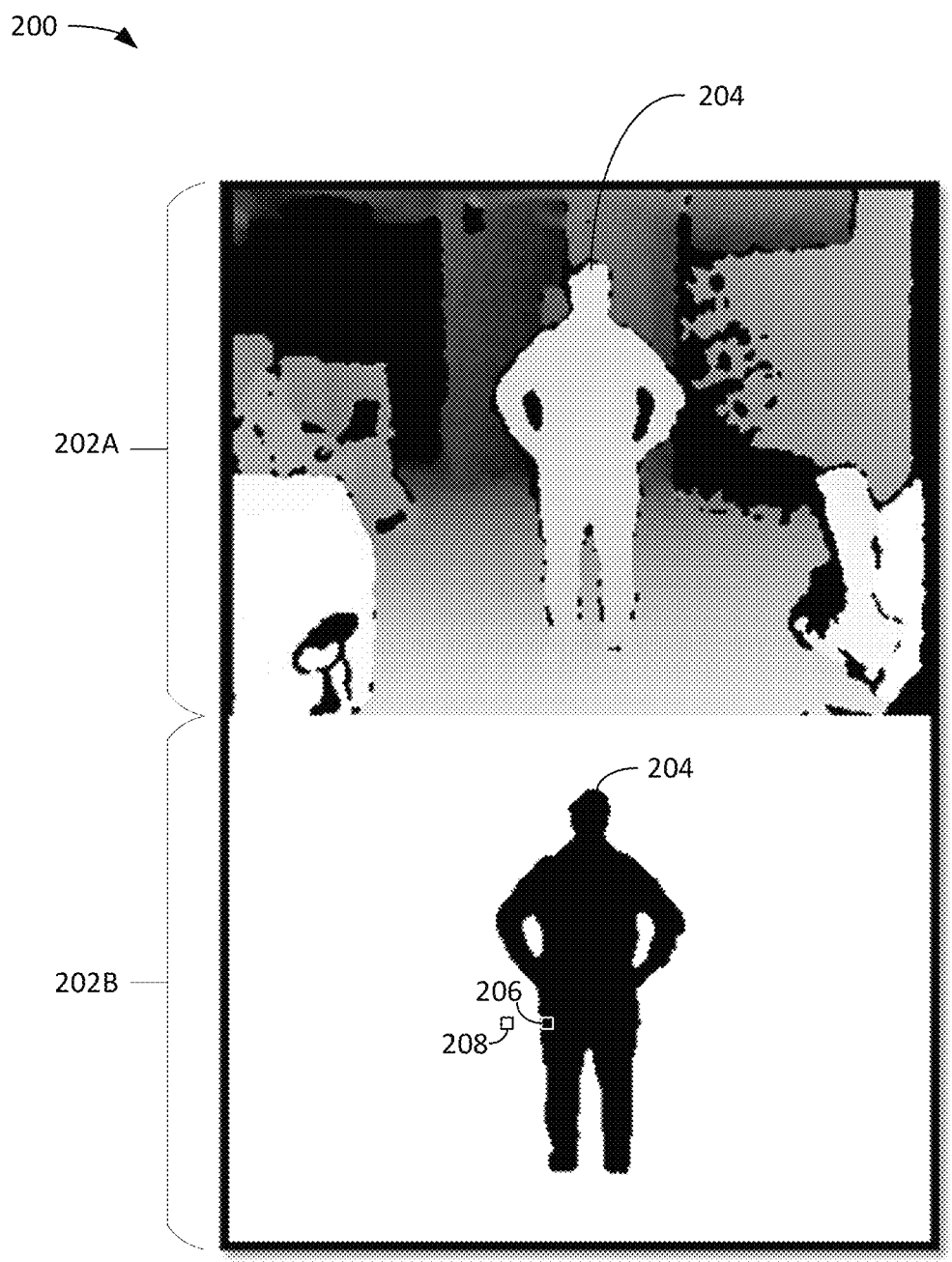
FIG. 2 depicts example depth image data including a two-dimensional depth image and a corresponding image segmentation mask.

System 100 includes a depth image generator 102 configured to generate depth images and corresponding segmentation masks 103, such as shown in the example of FIG. 2.

In FIG. 2, example depth image data 200 includes a two-dimensional depth image 202A and a corresponding image segmentation mask 202B.

In the example of FIG. 2, two-dimensional depth image 202A comprises a two-dimensional image in which each pixel of the image contains a value that represents a distance from the image sensor's (e.g., optical camera) center to the world-space 3D location, as projected through the image sensor optics to the given 2D pixel location. Thus, a pixel in depth image 202A may be represented by two coordinate dimensions, x and y, and a depth value, z, i.e., (x, y, z), or as $p_{x,y}=z$.

In the example of FIG. 2, image segmentation mask 202B comprises a two-dimensional image in which each pixel of the image comprises a binary value, such as a Boolean value of either "True" (represented as black pixels) or "False" (represented as white pixels). For example, pixel 206 represents a "True" pixel and pixel 208 represents a "False" pixel.

The pattern of Boolean values in image segmentation mask 202B determines a segmentation of the two-dimensional depth image 202A into foreground and background pixels representative of foreground and background objects in depth image 202A. For example, a conventional foreground/background segmentation algorithm may be used, such as background subtraction and connected component analysis. In this example, the pixels in image segmentation mask 202B containing the Boolean value "True" indicate the foreground pixels in the depth image 202A. The image segmentation mask 202B thus segments the depth image 202A into a set of foreground pixels that are identified as a foreground object of interest 204 in depth image 202A, which in this example indicates a human silhouette.

Notably, in the example of FIG. 2, the depth image 202A and the image segmentation mask 202B are both represented as two-dimensional images having the same width and height and the same number of pixels, which means there is a one-to-one correspondence between the pixels of depth image 202A and the pixels of image segmentation mask 202B. Thus, a pixel at a specific 2D image coordinate in depth image D (e.g., $x_D$, $y_D$) has a corresponding pixel at the same 2D image coordinate in image segmentation mask S (e.g., $x_S$, $y_S$). Thus, the depth value of a pixel p in depth image D at coordinates x, y may be expressed as $p_{x,y}^D=z$, and the binary (e.g., Boolean) value of the pixel p in the corresponding image segmentation mask S may be expressed as $p_{x,y}^S=b$.

In another embodiment (not depicted), the image segmentation mask may be encoded as a layer or channel of the depth image. So, for example, a pixel value in such a depth image may be represented by two coordinate dimensions, x and y, a depth value, z, and a Boolean value b, i.e., (x, y, z, b). In such an example, the value of a pixel p at coordinates x, y may be expressed as $p_{x,y}=\{z, b\}$. The remainder of this description will use the example of corresponding depth and image segmentation images, as depicted in FIG. 2, but the alternative representation is equally applicable throughout.

Returning to FIG. 1, depth image generator 102 may comprise, for example, a depth camera configured to produce one or more (e.g., a sequence of) depth images similar to how a video camera produces a video as a sequence of RGB images, and a software module that produces corresponding image segmentation masks using established segmentation algorithms. In alternative embodiments, depth image generator 102 may likewise comprise other depth sensing devices, such as 3D light detection and ranging (LIDAR) sensors, synthetic-aperture radar sensors, dense stereo reconstruction cameras, or synthetic depth image renderers, to name a few examples.

Depth image generator 102 provides the 2D depth image and 2D segmentation mask data 103 to feature vector generator 104, which is generally configured to take multi-dimensional input data (e.g., depth image and segmentation mask data 103) and generate unidimensional vector output data suitable for machine learning model 106.

For example, feature vector generator 104 may start at a first "seed" pixel in a depth image (e.g., 202A in FIG. 2) (which has a corresponding coordinate in a segmentation mask) and traverse a sequence of pixels starting from the seed pixel in the depth image. This sequence of pixels may be referred to as a seed pixel sequence, such as depicted and described in more detail below with respect to FIGS. 3A and 3B.

For each seed pixel in the seed pixel sequence, feature vector generator 104 may project a sampling line of pixels in the depth image that starts at the seed pixel and passes through the depth image in a selected fashion (e.g., in a vertical or horizontal direction). Generally, one or more of the sampling lines (e.g., a subset of the sampling lines) will pass through a portion of the depth image containing the foreground object, as defined by the image segmentation mask. Herein, the sampling line is generally referred to as a straight line, but in other embodiments, a sampling path may defined taking a different form, such as a curve, zig-zag, or a spiral form.

Feature vector generator 104 may traverse each sampling line, pixel-by-pixel, in order to determine feature data to be vectorized. When considering each pixel in a sampling line, feature vector generator 104 may use both the depth values from the depth image and the Boolean values from the segmentation mask to determine the feature data to be vectorized.

For example, in one embodiment, feature vector generator 104 may use the depth value at a pixel in the depth image (e.g., $p_{x,y}^D$=z) to determine a feature vector value when the Boolean value for a pixel in segmentation mask is "True", (e.g., $p_{x,y}^S$=TRUE). One the other hand, where the Boolean value for a pixel in the segmentation mask is "False" (e.g., $p_{x,y}^S$=FALSE), feature vector generator 104 may ignore the depth value in the corresponding pixel in the depth image, which beneficially cuts down on the amount of feature data generated by feature vector generator 104. This reduction in feature data results in faster and less computationally expensive training of machine learning model 106, and additionally reduces the size of machine learning model 106. Thus, as feature vector generator 104 traverses each pixel in each sampling line based on the seed pixel sequence, it aggregates feature data into feature vector 105 (V), which is the model input for machine learning model 106.

Machine learning model 106 is configured to generate an inference (e.g., 107) as model output regarding one or more characteristics of a foreground object found in a depth image based on feature values encoded into feature vector 105 by feature vector generator 104.

In some embodiments, machine learning model 106 may comprise an artificial neural network (ANN), which is generally an interconnected group of nodes divided into unidimensional layers with an input layer, an output layer, and at least one additional layer in between the input and output layers. Generally, an ANN can be used to estimate or approximate mathematical functions of the form $f: X \rightarrow Y$.

For example, in one embodiment, model 106 may be configured to infer skeletal joint positions of a human subject (which may collectively relate to a pose of the human subject) depicted in depth images, such as depicted in FIG. 2, based on the feature vector 105 generated by feature vector generator 104.

Inference 107 may be used as an input to an application (e.g., 108) of any sort. For example, where inference 107 relates to skeletal joint positions of human subjects, the inference may be used to depict an inferred skeletal structure in a graphical user interface, a motion tracking software application, a gesture analysis technique, a character animation system, or a game engine application. Further, the inferred skeletal joint positions may be used for other purposes, such as activity tracking of a human subject. In one example, the joint positions may be used by an activity tracking application for directing patient rehabilitation activities.

Inference 107 may be used for initial as well as ongoing training via trainer 110 based on labeled "ground truth" data. Thus, trainer 110 is generally representative of a computing module that uses one or more machine learning algorithms to generate a function (f) that maps a set of input features (X) (e.g., in feature vector 105) to an output vector (Y) (e.g. inference 107). In one example, a labeled training data instance may include the known skeletal joint positions and/or related pose associated with a human subject depicted in depth image data, such as depicted in FIG. 2.

In one embodiment, machine learning model 106 is a fully-connected neural network (FCNN) (e.g., an artificial neural network in which the mapping between the nodes of any two layers is a complete bipartite graph) and trainer 110 uses backpropagation to improve the accuracy of machine learning model 106. Generally, such training involves updating internal model parameters so that machine learning model 106 can better recognize predetermined patterns (e.g. human poses) to a measurable accuracy.

Example Seed Pixel Sequences and Sampling Line Projections

Figure 3A:
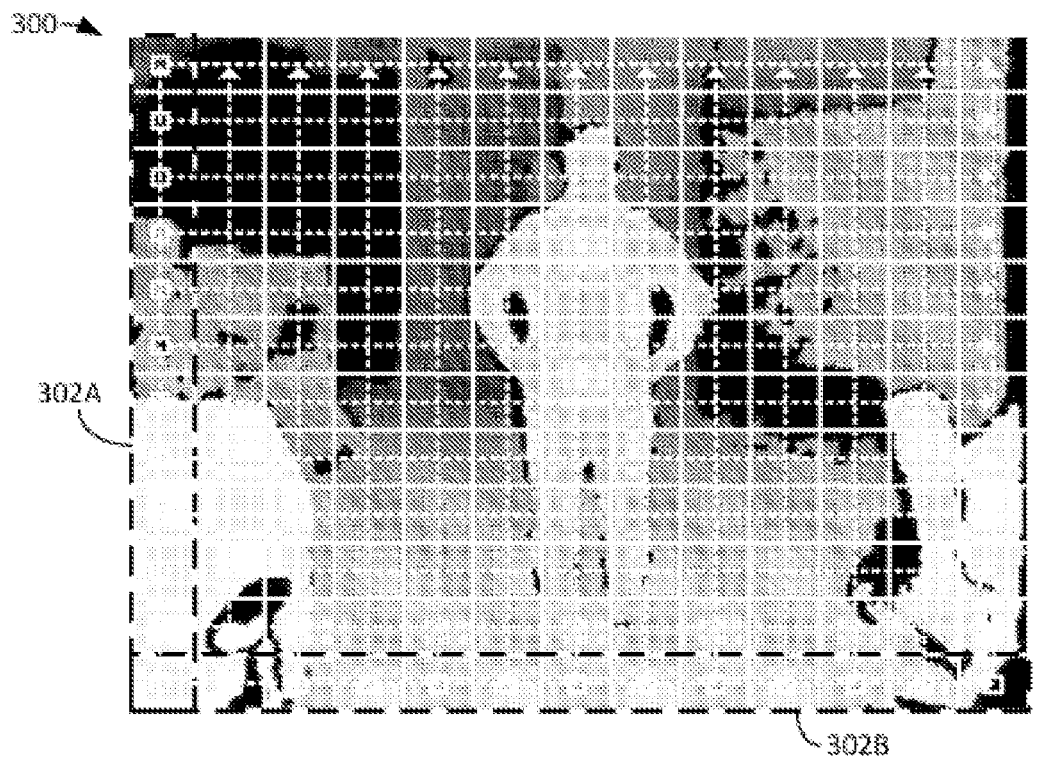
FIGS. 3A and 3B depict example seed pixel sequences and sampling line projections.
Figure 3B:
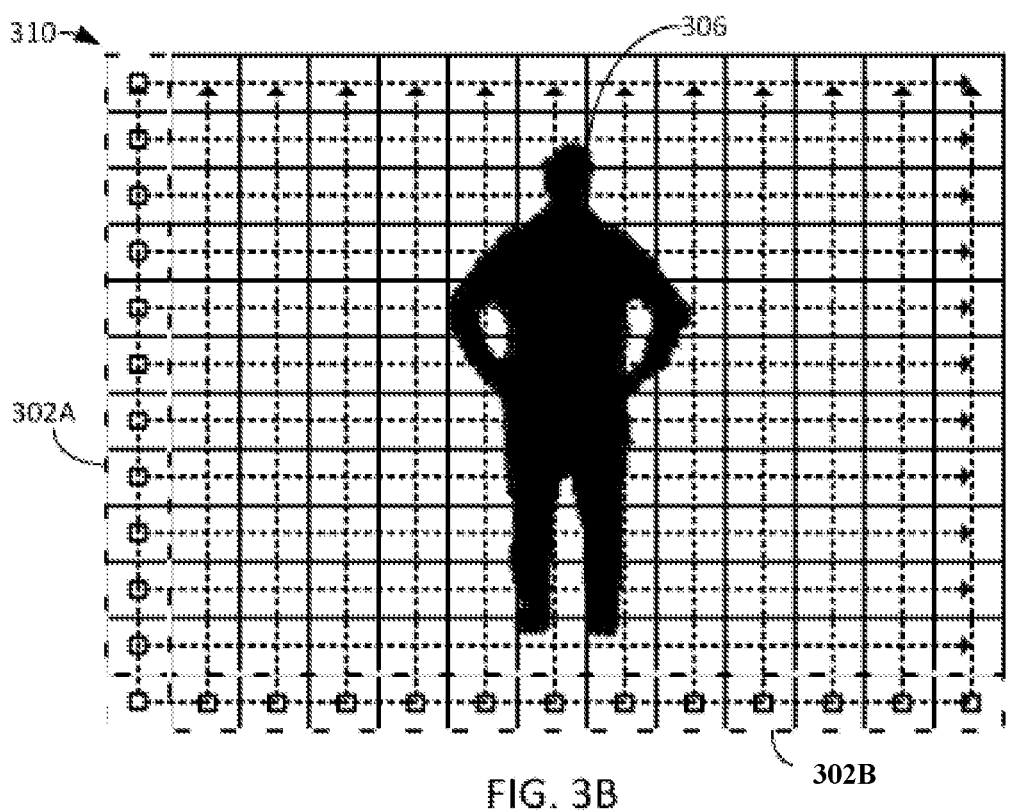

FIGS. 3A and 3B depict example seed pixel sequences and sampling line projections.

In particular, in FIG. 3A depicts a depth image 300 with two seed pixel sequences 302A and 302B overlaid.

Seed pixel sequence 302A comprises the first column of pixels starting at the first (top-most) row and ending at the last (bottom-most) row, i.e., a 12×1 array of seed pixels. In this example, an orthogonal sampling line is projected from each seed pixel in seed pixel sequence 302A (horizontally in this example) and traverses depth image 300 from one extent to another (e.g., from the first column to the last column along a common row).

Seed pixel sequence 302B comprises the last row of pixels starting from the first (left-most) column and ending at the last (right-most) column, i.e., a 1×13 array of seed pixels. Here again, an orthogonal sampling line is projected from each seed pixel in seed pixel sequence 302B (vertically in this example) and traverses the depth image from one extent to another (e.g., from the last row to the first row along a common column).

Collectively, seed pixel sequences 302A and 302B may be referred to as a seed pixel set. Notably, while seed pixel sequences 302A and 302B are described as separate seed pixel sequences in this example, these sequences may be combined into a single seed pixel sequence and thus define the same seed pixel set.

FIG. 3A thus depicts one example of a method of generating seed pixel sequences moving around the perimeter (or edges) of a depth image. In this example, seed pixel sequences 302A and 302B partially enclose foreground object 306 (the human silhouette).

Note that while only two seed pixel sequences are depicted in FIG. 3A, others are possible. For example, one seed pixel sequence for each edge of depth image 300 could be generated with orthogonal sampling line projections. In other words, seed pixel sequences 302A and 302B, which cover two of the four edges of depth image 300 could be supplemented with two more pixel sequences covering the remaining two edges of depth image 300. In some examples, the seed pixel set may be generated by following the periphery of depth image 300 from a first pixel until the periphery returns to that first pixel in either a clockwise or counter-clockwise direction. In such examples, the seed pixel sequence(s) would fully enclose foreground object 306.

While each sampling line in FIG. 3A is depicted as a straight line in this example, sampling lines may take other forms in other examples. For example, alternative sampling lines (or paths) could be angled, curved, zig-zag, spiral, or follow other paths.

FIG. 3B depicts the same arrangement of seed pixel sequences (302A and 302B) as in FIG. 3A, but overlaid on image segmentation mask 310. Here again, only two seed pixel sequences are depicted in FIG. 3B (corresponding with those in FIG. 3A), but others patterns are possible. For example, one seed pixel sequence for each edge of depth image 300 could be generated with orthogonal sampling line projections, or one seed pixel sequence could comprise the entire periphery of image segmentation mask 310.

Example Feature Generation Based on Sampling Line Projections

Figure 4:
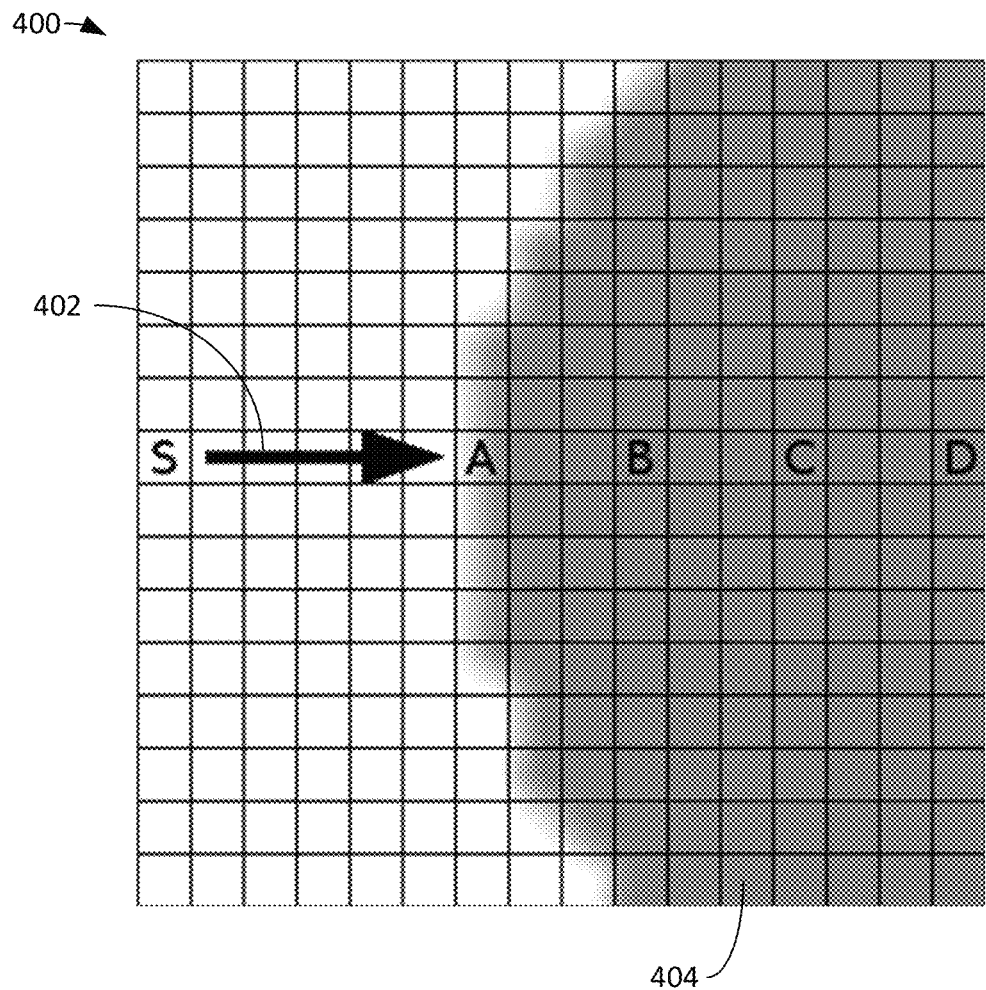
FIG. 4 depicts an example of generating model input data features based on a sampling line.

FIG. 4 depicts an example of generating model input data features based on a sampling line 402 (S). In FIG. 4, the dark pixels (e.g., 404) indicate a foreground object in segmentation mask 400.

In this example, sampling line 402 starts at seed pixel S and encounters a first boundary pixel at A. Generally, a first boundary pixel is the first pixel along a sampling line (e.g., 5) whose location (e.g., coordinates) in the segmentation mask is identified as a foreground object of interest (e.g., a first "true" pixel).

Subsequent depth pixels may then be determined based on the position of the first boundary pixel. Generally, subsequent depth pixels are a set of pixels along a sampling line (e.g., 5) in a sequence following the first boundary pixel, where each subsequent depth pixel is offset from the previous subsequent depth pixel by a constant number of pixels, referred to as the stride. In FIG. 4, pixel A is the first boundary pixel and pixels B, C, and D are subsequent depth pixels with a stride of three pixels, and pixels A, B, C, and D may be referred to as a sampling line pixel set. The values of pixels A, B, C, and D along sampling line S in a corresponding depth image (not depicted) may be use to generate model input data (e.g., feature vector 105 in FIG. 1).

Figure 5:
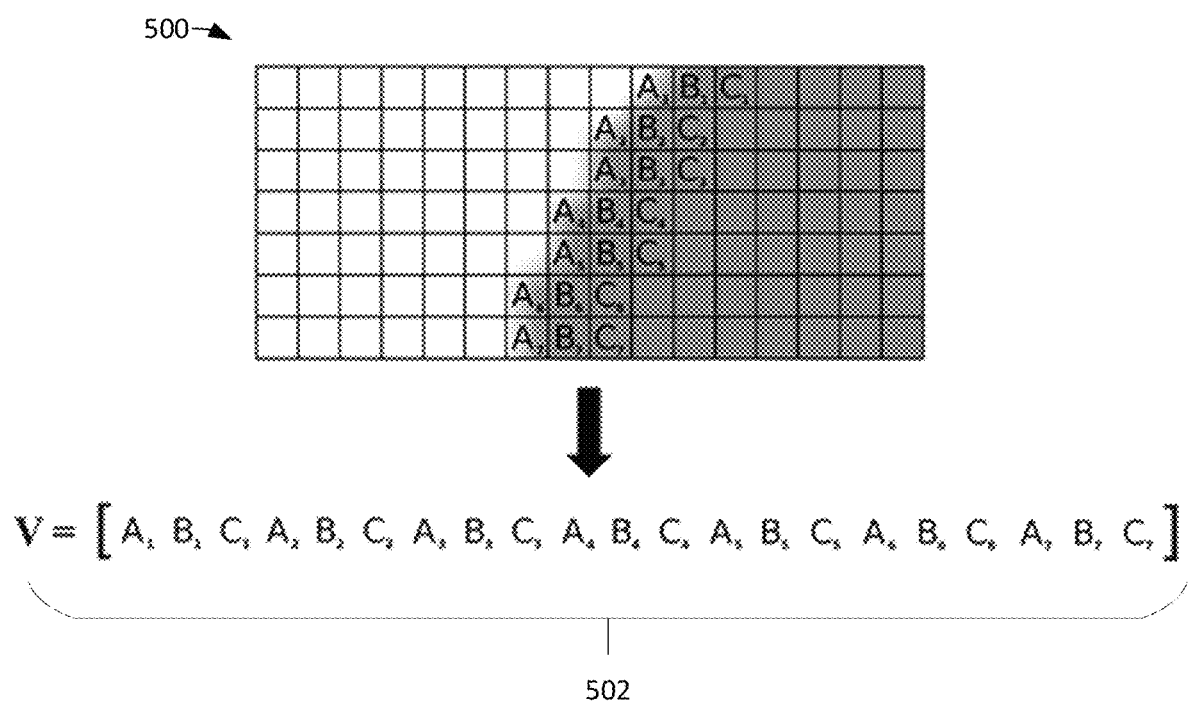
FIG. 5 depicts another example of generating model input data features based on a sampling line.

FIG. 5 depicts seven sampling line pixel sets based on horizontally projected sampling lines (not depicted) across image segmentation mask 500 (and across a corresponding depth image, which is not depicted). In this example, the stride is zero pixels. The values of each sampling pixel set in the corresponding depth image (not depicted) are used to form feature vector 502 (V), which is an example of a feature vector 105 in FIG. 1.

Example Methods for Processing Depth Image Data

Figure 6:
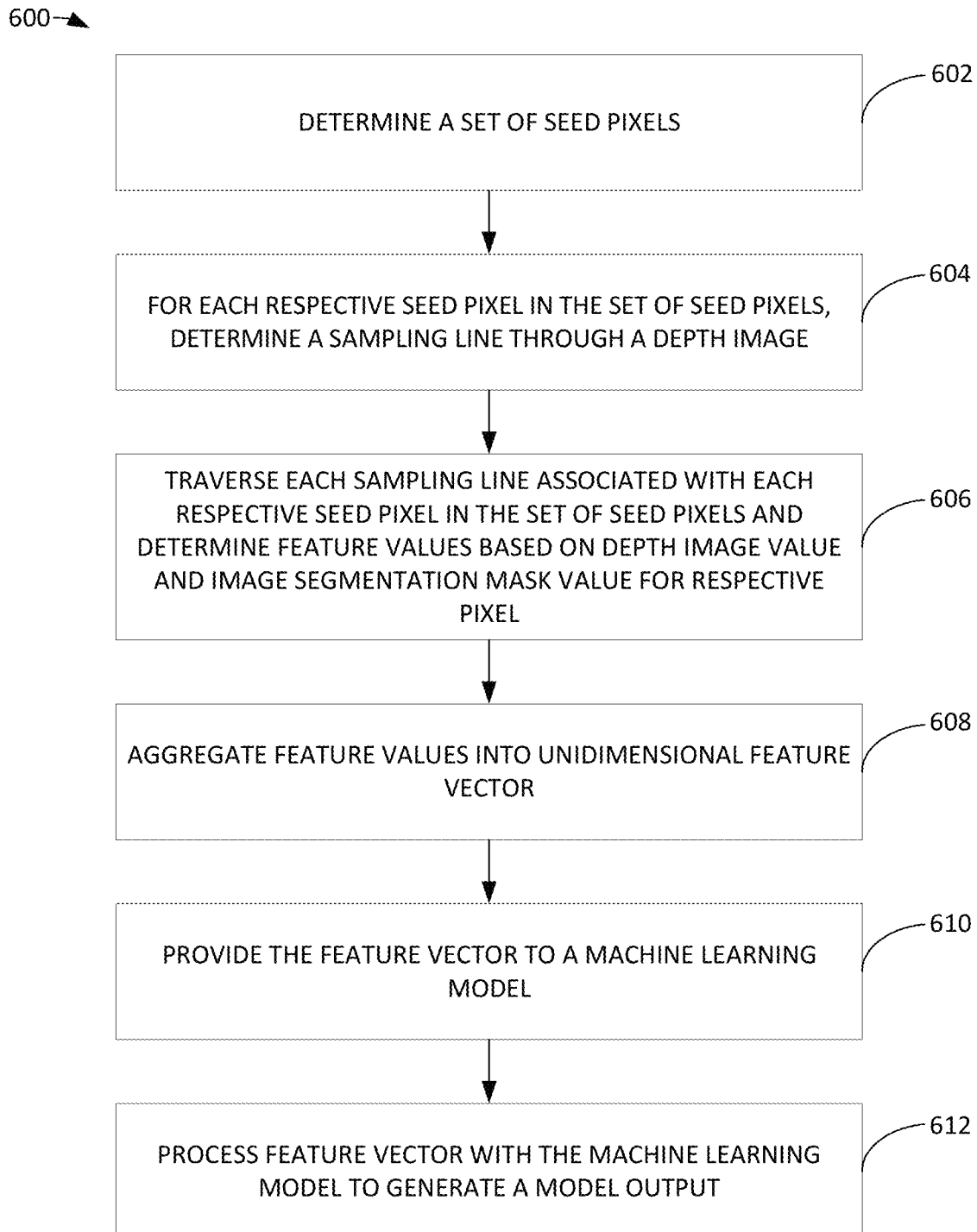
FIG. 6 depicts an example method for processing depth image data.

FIG. 6 depicts an example method 600 for processing depth image data. For example, method 600 may be performed by system 100 of FIG. 1.

Method 600 begins at step 602 with determining a set of seed pixels for a depth image, such as described above with respect to FIGS. 3A and 3B. In one embodiment, the set of seed pixels may be determined by starting at an initial pixel image coordinate (e.g., 0,0) and traversing each perimeter (or edge) pixel of the depth image in sequence until returning to the starting pixel.

Method 600 then proceeds to step 604 with determining a sampling line for each seed pixel in the set of seed pixels, such as described above with respect to FIGS. 3A and 3B. As described above, in some examples, each sampling line may be a horizontal or vertical line through the depth image starting from the seed pixel and ending at the opposite edge of the image.

In one embodiment, a set of conditional tests may be used to determine the sampling line, such as: if the seed pixel is along a top edge of the depth image, then the sampling line is a vertical line starting at the seed pixel and ending at an edge pixel at the bottom of the depth image with the same x-coordinate as the starting pixel.

Else, if the seed pixel is along the bottom of the depth image, then the sampling line is a vertical line starting at the seed pixel and ending at an edge pixel at the top of the image with the same x-coordinate as the starting pixel.

Else, if the seed pixel is along the left side of the depth image, then the sampling line is a horizontal line starting at the seed pixel and ending at an edge pixel at the right side of the image with the same y-coordinate as the starting pixel.

Else, if the seed pixel is along the right side of the depth image, then the sampling line is a horizontal line starting at the seed pixel and ending at the edge pixel at the left side of the image with the same y-coordinate as the starting pixel.

Else, if the seed pixel is at one of the four corners of the depth image, then two sampling lines are determined, one horizontal line and one vertical line following the same pattern as the non-corner seed pixels.

Notably, this same set of criteria works for depth images of many shapes, not just rectangular as in the examples depicted herein.

Method 600 then proceeds to step 606 with traversing each sampling line and determining values for each pixel in the sampling line. In one example, the traversal may be in a sequence starting with the seed pixel that determined the sampling line and ending with the ending edge pixel of the sampling line.

The value for each pixel along a sampling line may be determined by a depth value from the depth image and a binary value (e.g., a Boolean value) from the segmentation mask. As described above, where a binary value in a segmentation mask indicates that the corresponding pixel in the depth image is not associated with a foreground object of interest, the depth image value may be ignored.

In one embodiment, sampling pixel sets may be determined according to certain criteria. For example, a first boundary pixel may be determined as the first pixel along the sampling line whose location in the segmentation mask is identified as a foreground object of interest.

Then, a closest depth pixel or a set of subsequent depth pixels may be determined based on the location of the first boundary pixel.

The closest depth pixel may be determined as the pixel in the sampling line whose depth value is closer to the depth sensor's center of projection than the depth value of any other pixel in the sampling line.

Based on the first boundary pixel and closest depth pixel, several features may be determined, including: a distance in pixels from the sampling line's starting pixel to the first boundary pixel; a depth value from the depth image at the coordinates of the first boundary pixel; a distance in pixels from the sampling line's starting pixel to the closest depth pixel; a depth value from the depth image at the coordinates of the closest depth pixel; a mean depth along the sampling line, which may be further normalized by the quantity of sampling line pixels whose binary values in the segmentation mask identify as the foreground; and a mean depth along the sampling line normalized by sampling line length. Notably, these are just examples, and one or more of these examples may be used in addition with other values determined based on the depth image, image segmentation mask, seed pixels, and sampling lines.

In an alternative embodiment, instead of a closet depth pixel, a set of subsequent depth pixels may be determined, such as depicted and described above with respect to FIGS. 4 and 5. As above, subsequent depth pixels may be a set pixels along the sampling line in sequence that follow the first boundary pixel by a fixed offset, referred to as a stride.

Based on the first boundary pixel and the subsequent depth pixels, several features may be determined, including: a depth value from the depth image at the coordinates of the first boundary pixel; and depth values from the depth image at the coordinates of each pixel in the set of subsequent depth pixels.

Method 600 then proceeds to step 608 with aggregating the features computed for each sampling line into a unidimensional form, such as a vector (e.g., as depicted in FIG. 5).

In some cases, a vector V may have a length L based on the number of seed pixels (e.g., the number of pixels around a perimeter of the depth image, where each corner of an image is counted twice). For example, given a rectangular depth image of width W pixels and height H pixels, there are 2W+2H seed pixels in the image perimeter and thus 2W+2H sampling lines. Each sampling line may generate F features (e.g., four features in the example of FIGS. 4, and 3 features in the example of FIG. 5), which gives a vector length L of F(2W+2H).

Method 600 then proceeds to step 610 with inputting the input data vector (e.g., V) into a machine learning model (e.g., 106 of FIG. 1). As above, in some embodiments, the machine learning mode may be a fully-connected neural network.

Method 600 then proceeds to step 612 with processing the input data vector using the machine learning model to generate an inference. In some cases, the inference may be used as part of training the machine learning model, such as where an appropriate output (e.g., label) is known for the input data vector. In other cases, the inference may be used as part of an application (e.g., application 108 in FIG. 1).

Figure 7:
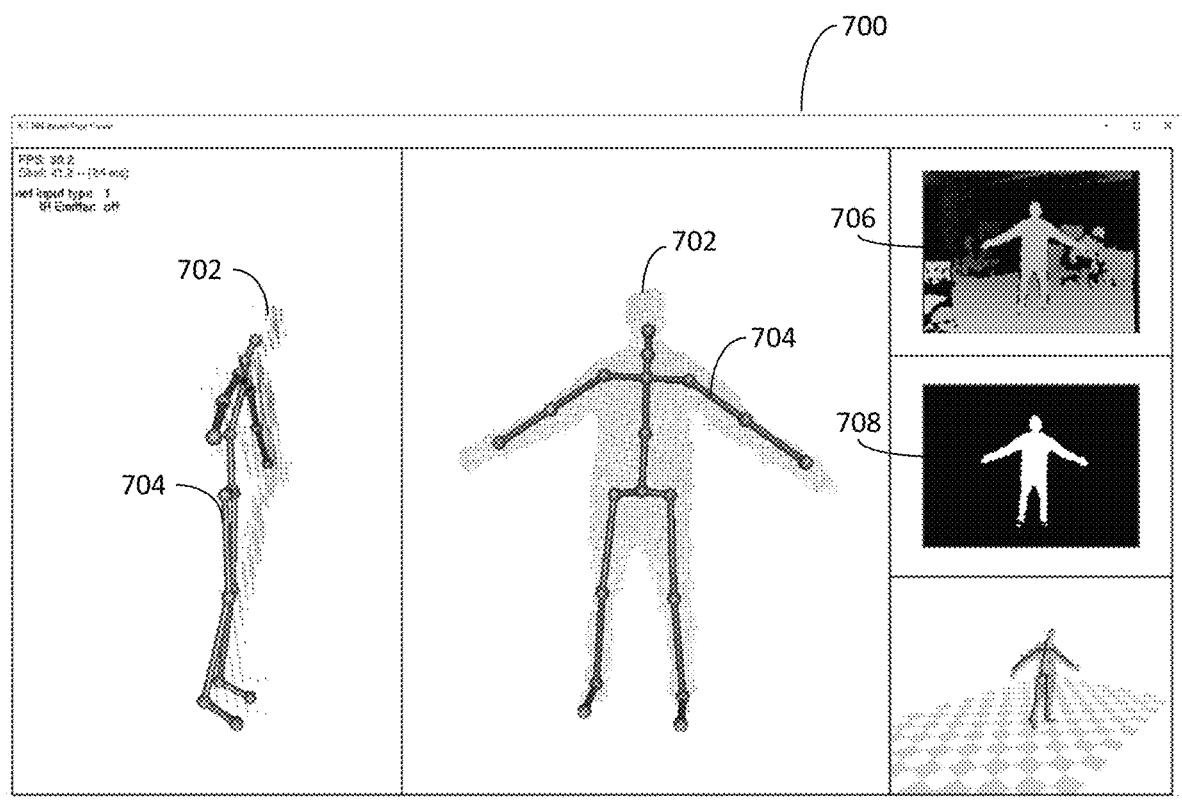
FIG. 7 depicts an example application output based on a machine learning model and depth image data.

For example, FIG. 7 depicts an example output of an application 700 where skeletal joint positions 704 of a human subject 702 are predicted by machine learning model (e.g., model 106 in FIG. 1) based on depth image data 706 with a corresponding image segmentation mask 708. Note that application 700 depicted in FIG. 7 is just one example (e.g., of application 108 in FIG. 1), and many others are possible.

EXAMPLE EMBODIMENTS

Example 1

A method of determining foreground object characteristics of image data, comprising: receiving a depth image of a first size from a depth sensor; receiving a segmentation mask of the first size, wherein the segmentation mask corresponds to the depth image and segments the depth image into a set of foreground pixels and a set of background pixels; determining a set of seed pixels in the depth image, wherein the set of seed pixels either fully or partially encloses a foreground object in the depth image; for each respective seed pixel of the set of seed pixels: determining a sampling line in the depth image that starts at the respective seed pixel and passes through a portion of the depth image; for each respective sampling line pixel in the sampling line having a value in the segmentation mask indicating a foreground object in the depth image: determining one or more data attribute values based on a depth value for the respective sampling line pixel in the depth image; and adding the one or more data attribute values to a feature vector.

Example 2

The method of Example 1, further comprising: providing the feature vector to a machine learning model; and receiving an output from the machine learning model.

Example 3

The method of Example 2, wherein the machine learning model is a fully-connected neural network.

Example 4

The method of Example 3, further comprising: inferring one or more skeletal joint positions of a human subject based on the output from the machine learning model.

Example 5

The method of Example 2, further comprising: for each respective sampling line associated with each respective seed pixel of the set of seed pixels: determining a first boundary pixel in the respective sampling line whose location in the segmentation mask is identified as the foreground object; and determining a closest depth pixel in the respective sampling line whose depth value is closer to the depth sensor's center of projection than a depth value of any other pixel in the respective sampling line.

Example 6

The method of Example 5, wherein the one or more data attribute values for each respective pixel comprises one or more of: a distance in pixels from a starting pixel of the respective sampling line to the first boundary pixel of the respective sampling line; a depth value from the depth image at coordinates of the first boundary pixel; a distance in pixels from the starting pixel of the respective sampling line to the closest depth pixel; a depth value from the depth image at coordinates of the closest depth pixel; a mean depth along the respective sampling line normalized by a quantity of respective sampling line pixels whose Boolean values in the segmentation mask identify as the foreground; or a mean depth along the respective sampling line normalized by respective sampling line length.

Example 7

The method of Example 2, further comprising: for each respective sampling line associated with each respective seed pixel of the set of seed pixels: determining a first boundary pixel in the respective sampling line whose location in the segmentation mask is identified as the foreground object; and determining one or more subsequent depth pixels according to a predetermined stride.

Example 8

The method of Example 7, wherein the one or more data attribute values for each respective pixel comprises at least: a depth value from the depth image at the coordinates of the first boundary pixel; and a depth value from the depth image at the coordinates of each of the one or more subsequent depth pixels.

Example 9

The method of Example 2, wherein the depth sensor comprises a depth camera configured to generate depth images with pixel resolution of 640×480 at 30 frames per second.

Example 10

The method of Example 2, wherein the depth sensor comprises a dense stereo reconstruction camera.

Example 11

The method of Example 2, wherein the depth sensor comprises a synthetic depth image renderer.

Example 12

A system for determining foreground object characteristics of image data, comprising: a memory comprising computer-executable instructions; one or more processors configured to execute the computer-executable instructions and cause the system to: receive a depth image of a first size from a depth sensor; receive a segmentation mask of the first size, wherein the segmentation mask corresponds to the depth image and segments the depth image into a set of foreground pixels and a set of background pixels; determine a set of seed pixels in the depth image, wherein the set of seed pixels either fully or partially encloses a foreground object in the depth image; for each respective seed pixel of the set of seed pixels: determine a sampling line in the depth image that starts at the respective seed pixel and passes through a portion of the depth image; for each respective sampling line pixel in the sampling line having a value in the segmentation mask indicating a foreground object in the depth image: determine one or more data attribute values based on a depth value for the respective sampling line pixel in the depth image; and add the one or more data attribute values to a feature vector.

Example 13

The system of Example 12, wherein the one or more processors are further configured to: provide the feature vector to a machine learning model; and receive an output from the machine learning model.

Example 14

The system of Example 13, wherein the machine learning model is a fully-connected neural network.

Example 15

The system of Example 14, wherein the one or more processors are further configured to: infer one or more skeletal joint positions of a human subject based on the output from the machine learning model.

Example 16

The system of Example 13, wherein the one or more processors are further configured to: for each respective sampling line associated with each respective seed pixel of the set of seed pixels: determine a first boundary pixel in the respective sampling line whose location in the segmentation mask is identified as the foreground object; and determine a closest depth pixel in the respective sampling line whose depth value is closer to the depth sensor's center of projection than a depth value of any other pixel in the respective sampling line.

Example 17

The system of Example 16, wherein the one or more data attribute values for each respective pixel comprises one or more of: a distance in pixels from a starting pixel of the respective sampling line to the first boundary pixel of the respective sampling line; a depth value from the depth image at coordinates of the first boundary pixel; a distance in pixels from the starting pixel of the respective sampling line to the closest depth pixel; a depth value from the depth image at coordinates of the closest depth pixel; a mean depth along the respective sampling line normalized by a quantity of respective sampling line pixels whose Boolean values in the segmentation mask identify as the foreground; or a mean depth along the respective sampling line normalized by respective sampling line length.

Example 18

The system of Example 13, wherein the one or more processors are further configured to: for each respective sampling line associated with each respective seed pixel of the set of seed pixels: determine a first boundary pixel in the respective sampling line whose location in the segmentation mask is identified as the foreground object; and determine one or more subsequent depth pixels according to a predetermined stride.

Example 19

The system of Example 18, wherein the one or more data attribute values for each respective pixel comprises at least:

a depth value from the depth image at the coordinates of the first boundary pixel; and a depth value from the depth image at the coordinates of each of the one or more subsequent depth pixels.

Example 20

The system of Example 13, wherein the depth sensor comprises one of: a depth camera configured to generate depth images with pixel resolution of 640×480 at 30 frames per second, a dense stereo reconstruction camera, or a synthetic depth image renderer.

ADDITIONAL CONSIDERATIONS

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method of determining foreground object characteristics of image data, comprising:
   receiving a depth image of a first size from a depth sensor;
   receiving a segmentation mask of the first size, wherein the segmentation mask corresponds to the depth image and segments the depth image into a set of foreground pixels and a set of background pixels;
   determining a set of seed pixels in the depth image, wherein the set of seed pixels either fully or partially encloses a foreground object in the depth image;
   for each respective seed pixel of the set of seed pixels:
      determining a sampling line in the depth image that starts at the respective seed pixel and passes through a portion of the depth image;
      for each respective sampling line pixel in the sampling line having a value in the segmentation mask indicating the foreground object in the depth image:
         determining one or more data attribute values based on a depth value for the respective sampling line pixel in the depth image; and
         adding the one or more data attribute values to a feature vector.

2. The method of claim 1, further comprising:
   providing the feature vector to a machine learning model; and
   receiving an output from the machine learning model.

3. The method of claim 2, wherein the machine learning model is a fully-connected neural network.

4. The method of claim 2, further comprising: for each respective sampling line associated with each respective seed pixel of the set of seed pixels:
   determining a first boundary pixel in the respective sampling line whose location in the segmentation mask is identified as the foreground object; and
   determining a closest depth pixel in the respective sampling line whose depth value is closer to the depth sensor's center of projection than a depth value of any other pixel in the respective sampling line.

5. The method of claim 2, further comprising: for each respective sampling line associated with each respective seed pixel of the set of seed pixels:
   determining a first boundary pixel in the respective sampling line whose location in the segmentation mask is identified as the foreground object; and
   determining one or more subsequent depth pixels according to a predetermined stride.

6. The method of claim 2, wherein the depth sensor comprises a depth camera configured to generate depth images with pixel resolution of 640×480 at 30 frames per second.

7. The method of claim 2, wherein the depth sensor comprises a dense stereo reconstruction camera.

8. The method of claim 2, wherein the depth sensor comprises a synthetic depth image renderer.

9. The method of claim 3, further comprising: inferring one or more skeletal joint positions of a human subject based on the output from the machine learning model.

10. The method of claim 4, wherein the one or more data attribute values for each respective pixel comprises one or more of:
   a distance in pixels from a starting pixel of the respective sampling line to the first boundary pixel of the respective sampling line;
   a depth value from the depth image at coordinates of the first boundary pixel;
   a distance in pixels from the starting pixel of the respective sampling line to the closest depth pixel;
   a depth value from the depth image at coordinates of the closest depth pixel;
   a mean depth along the respective sampling line normalized by a quantity of respective sampling line pixels whose Boolean values in the segmentation mask identify as the foreground object in the depth image; or
   a mean depth along the respective sampling line normalized by respective sampling line length.

11. The method of claim 5, wherein the one or more data attribute values for each respective pixel comprises at least:
   a depth value from the depth image at the coordinates of the first boundary pixel; and
   a depth value from the depth image at the coordinates of each of the one or more subsequent depth pixels.

12. A system for determining foreground object characteristics of image data, comprising:
   a memory comprising computer-executable instructions;
   one or more processors configured to execute the computer-executable instructions and cause the system to:
      receive a depth image of a first size from a depth sensor;
      receive a segmentation mask of the first size, wherein the segmentation mask corresponds to the depth image and segments the depth image into a set of foreground pixels and a set of background pixels;
      determine a set of seed pixels in the depth image, wherein the set of seed pixels either fully or partially encloses a foreground object in the depth image;
      for each respective seed pixel of the set of seed pixels:
         determine a sampling line in the depth image that starts at the respective seed pixel and passes through a portion of the depth image;
         for each respective sampling line pixel in the sampling line having a value in the segmentation mask indicating the foreground object in the depth image:
            determine one or more data attribute values based on a depth value for the respective sampling line pixel in the depth image; and
            add the one or more data attribute values to a feature vector.

13. The system of claim 12, wherein the one or more processors are further configured to:
   provide the feature vector to a machine learning model; and
   receive an output from the machine learning model.

14. The system of claim 13, wherein the machine learning model is a fully-connected neural network.

15. The system of claim 13, wherein the one or more processors are further configured to: for each respective sampling line associated with each respective seed pixel of the set of seed pixels:
   determine a first boundary pixel in the respective sampling line whose location in the segmentation mask is identified as the foreground object; and
   determine a closest depth pixel in the respective sampling line whose depth value is closer to the depth sensor's center of projection than a depth value of any other pixel in the respective sampling line.

16. The system of claim 13, wherein the one or more processors are further configured to: for each respective sampling line associated with each respective seed pixel of the set of seed pixels:
   determine a first boundary pixel in the respective sampling line whose location in the segmentation mask is identified as the foreground object; and
   determine one or more subsequent depth pixels according to a predetermined stride.

17. The system of claim 13, wherein the depth sensor comprises one of:
   a depth camera configured to generate depth images with pixel resolution of 640×480 at 30 frames per second,
   a dense stereo reconstruction camera, or
   a synthetic depth image renderer.

18. The system of claim 14, wherein the one or more processors are further configured to: infer one or more skeletal joint positions of a human subject based on the output from the machine learning model.

19. The system of claim 15, wherein the one or more data attribute values for each respective pixel comprises one or more of:
   a distance in pixels from a starting pixel of the respective sampling line to the first boundary pixel of the respective sampling line;
   a depth value from the depth image at coordinates of the first boundary pixel;
   a distance in pixels from the starting pixel of the respective sampling line to the closest depth pixel;
   a depth value from the depth image at coordinates of the closest depth pixel;
   a mean depth along the respective sampling line normalized by a quantity of respective sampling line pixels whose Boolean values in the segmentation mask identify as the foreground object in the depth image; or
   a mean depth along the respective sampling line normalized by respective sampling line length.

20. The system of claim 16, wherein the one or more data attribute values for each respective pixel comprises at least:
   a depth value from the depth image at the coordinates of the first boundary pixel; and a depth value from the depth image at the coordinates of each of the one or more subsequent depth pixels.

* * * * *